May 24, 1966 J. G. BRAUN 3,252,218
PIPE CUTTER OF THE SPLIT-OPEN TYPE
Filed March 3, 1965 2 Sheets-Sheet 1

INVENTOR

Jean G. Braun

May 24, 1966  J. G. BRAUN  3,252,218
PIPE CUTTER OF THE SPLIT-OPEN TYPE
Filed March 3, 1965  2 Sheets-Sheet 2

INVENTOR
Jean G. Braun

United States Patent Office 3,252,218
Patented May 24, 1966

3,252,218
PIPE CUTTER OF THE SPLIT-OPEN TYPE
Jean G. Braun, 10654 Plaza, Montreal North,
Quebec, Canada
Filed Mar. 3, 1965, Ser. No. 436,751
2 Claims. (Cl. 30—98)

The present invention relates to tools for cutting pipes and more particularly to tools for cutting pipes that are situated in inaccessible locations that make it difficult or impossible to utilize conventional pipe cutting tools due to lack of operating space.

This invention covers a pipe cutter that may be utilized directly on location, even where small clearance is left between the pipe and a wall, the device comprising a cutter holder made in two half parts that may be separated from each other for placing the cutter holder on the pipe or removing the cutter holder from the pipe, and a ratchet ring also made of two half portions hinged to each other and removably surrounding said cutter holder, said ratchet ring having a long handle to be utilized without requiring the handle to circulate completely around the pipe, therefore eliminating a lot of the disadvantages that plumbers for instance, hitherto have encountered in carrying out their plumbing work and thereby saving a very considerable amount of time.

It is an object of this invention to provide a pipe cutter incorporating two semi-circular cutter holder half parts that may be located one at each side of the pipe, and thereafter attached to each other to form a substantially solid circular cutter holder that may be rotated around the pipe to perform its cutting action.

It is a further object of this invention, to provide a pipe cutter as above that incorporates removable ratchet means including a ratchet handle for rotation of the cutter holder through successive reciprocating motions of the ratchet means on one side of the pipe.

It is a further object of this invention to provide a pipe cutter incorporating automatic feed means for the cutters of this invention, that automatically will feed the cutter blades into the pipe as the cutter is rotated until the pipe has been cut right through.

It is a still further object of this invention to provide a pipe cutter as above in which the ratchet mechanism has a collar engaging an annular groove of the cutter holder to maintain the ratchet in a pre-set position of the cutting device and incorporating means for reversing the operating direction of the ratchet.

These and other objects and features of this invention will become apparent when taken in conjunction with the following drawing, in which.

Figure 2:
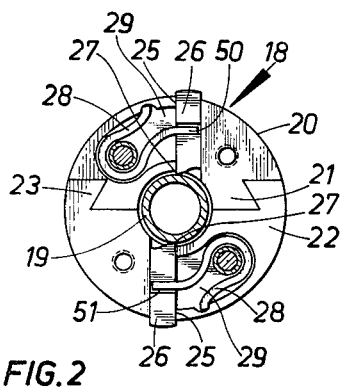
FIGURE 2 is a reverse plan view of a two part cutting head shown with a collar plate removed to illustrate the dovetail assembly of the two parts, and the spring loading of the cutter therein.
Figure 3:
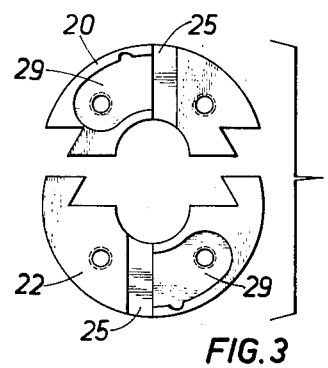
FIGURE 3 is a reverse plan view of the cutting head illustrated in FIGURE 2, shown in disassembled condition.
Figure 4:
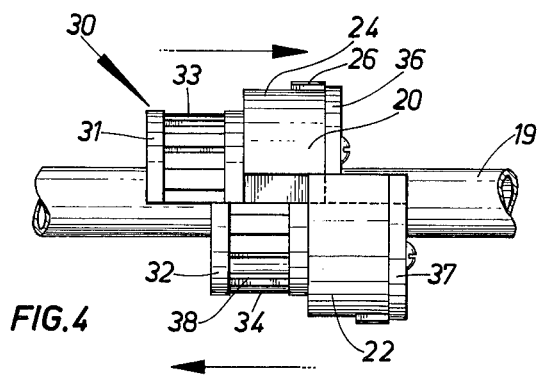

FIGURE 4 a side view of the cutting head shown in FIGURE 2, located on a pipe, the two half portions of the cutting head being in the process of being engaged with each other on the dovetail portion.

Figure 5:
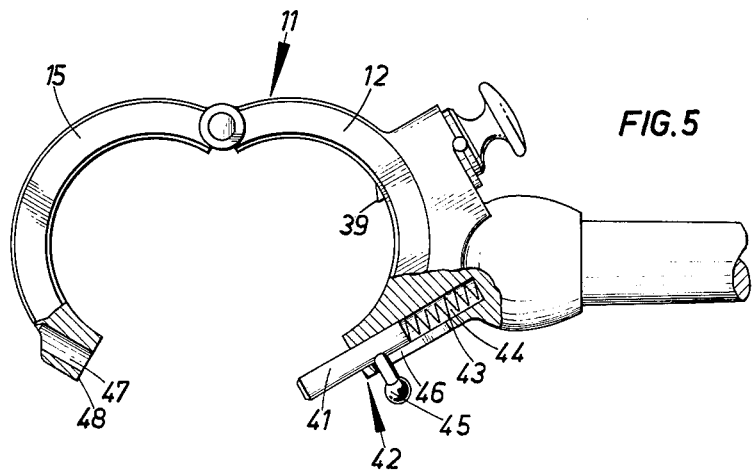

FIGURE 5 is a plan view of the ratchet mechanism incorporated in this invention showing this in open condition.

Figure 6:
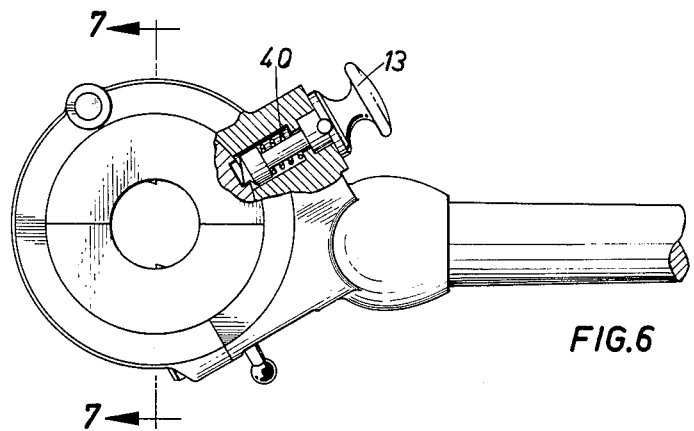

FIGURE 6 is a plan view of the ratchet mechanism illustrated in FIGURE 5, shown in its closed position.

Figure 7:
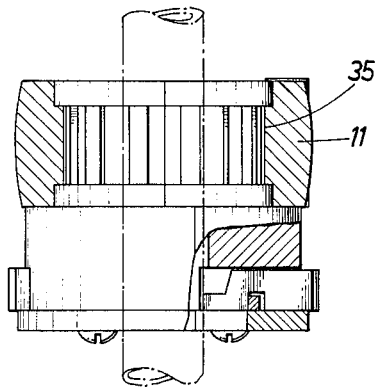

FIGURE 7 is a part sectional side view of the ratchet mechanism shown in FIGURE 6, taken on the line 7—7.

Figure 1:
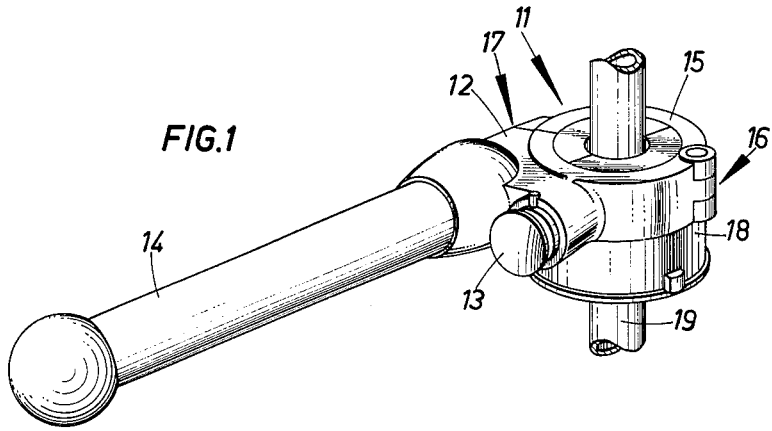
FIGURE 1 is a perspective view of a pipe cutter embodying this invention, shown located on a pipe.

Referring to FIGURE 1, a perspective view of a pipe cutter embodying this invention is shown comprising a ratchet ring shown at 11, consisting of a main ratchet half portion 12, containing a reversible ratchet pin 13, and having a handle 14, attached thereto, a secondary ratchet half portion 15 being hingeably attached to half portion 12 at 16, the free end of half portion 15 being releasably retained at 17 by spring loaded pin means as illustrated and explained later below.

A cutter holder 18 is shown assembled about a pipe 19, ratchet ring 11 being located and assembled in place over cutter holder 18 ready for cutting operation.

Referring particularly to FIGURES 2, 3, 4 and 7, details of the cutter holder 18 are illustrated showing a male half part 20, having a male dovetail 21, and female half part 22 having a female dovetail 23, dovetail 21 being slideably engageable within dovetail 23, male and female half parts together forming cutter holder 18, having a substantially cylindrical configuration, a forward portion 24 of cutter holder 18 having one or more radially located grooves 25 each adapted to slideably receive a cutter 26 having a suitably ground cutting edge 27, for engaging with and cutting into pipe 19 upon rotation of cutter holder 18.

A spring 28 is located within cut-outs 29 in cutter holder 18, one end 50 of spring 28 being located in a corresponding hole 51 in cutter 26, spring 28 biasing cutter 26 towards pipe 19 to ensure continuous cutting operation upon rotation of cutter holder 18 until pipe 19 has been cut through.

Rear portion of cutter holder 18 shown at 30 consists of an axial extension of forward portion 24, one half part 31 being integral with male half part 20 and another half part 32 being integral with female half part 22, assembly of male and female half parts 20 and 22 in alignment with each other thereby automatically aligning half parts 31 and 32 to form a cylindrical configuration, an annular groove half portion 33 in half part 31, thereby becoming aligned with annular groove half portion 34 of half part 32, ratchet ring 11 being internally supplied with annular projecting collar 35 adapted to rotatably engage within annular grooves 33 and 34 upon assembly of ratchet ring 11 on rear portion 30 of cutter holder 18, thereby locking male half part 20 and female half part 22 together, and preventing inadvertent slideable disengagement of dovetails 21 and 23.

Suitable cover plates 36 and 37 are removably fastened to cutter holder half parts 20 and 22, thereby retaining cutters 26 in place yet permitting cutters 26 to be removed for sharpening or the like as required. Plate 37 extends across female dovetail 23 and acts as a stop for slidable motion during assembly of half parts 20 and 22 to obtain correct alignment before ratchet ring 11 is assembled thereon.

The base of annular grooves 33 and 34 is formed in the configuration of a ratchet gear, having a plurality of ratchet teeth 38 adapted to be engaged by a pawl 39, shown in FIGURES 5 and 6, that is biased towards teeth 38 by spring 40, pawl 39 being attached to manually retractable and reversible pin 13.

A locking pin 41 is located at free end 42 of ratchet ring main half portion 12, spring 43 biasing pin 41 outwards of hole 44, handle 45 being attached in pin 41 and slidably located with a slot 46 to permit manual retraction of pin 41. A corresponding hole 47 in extreme end 48 of hingeable ratchet ring secondary half portion 15 is adapted to align with hole 44, upon ratchet ring half portions 12 and 15 being hingeably closed together, thereby permitting spring 43 to bias pin 41 into hole 47 and lock half portions 12 and 15 together during cutting operation. Upon cutting operation being completed, handle 45 is retracted, thereby retracting pin 41 and permitting removal of ratchet ring 11 from annular groove 33 and 34 and permitting cutter holder male and female half parts 20 and 22 to be slideably disengaged from each other for removal of cutter holder 18 from pipe 19.

In operation, cutter holder 18 is slideably assembled upon pipe 19, ratchet ring 11 is thereafter assembled on cutter holder 18 and half parts 12 and 15 of ratchet ring 11 are closed together, whereafter pawl 39 is aligned in correct direction and cutting operation is commenced by utilizing a reciprocating motion of handle 14 in the available space, thereby rotating cutter holder 18 in cutting direction, springs 28 biasing cutters 26 downwards automatically into the pipe 19 until this has been severed whereafter, ratchet ring 11 is removed, cutter holder half parts 20 and 22 slidably disengaged from each other, and removed from pipe 19.

Cutters 26 will automatically retract to the outside dimension of pipe 19, upon cutter head being located thereon, thereby not requiring preliminary retraction means.

The present invention therefore, eliminates the previous method of cutting pipes in difficult locations by use of a standard saw blade, a portion of which would be covered with a rag and held in the hand, this method being extremely tedious, sometimes dangerous and very time consuming, also resulting often in breakage of a considerable number of saw blades before one pipe has been cut through.

The general design of the individual parts of my invention as explained above may be varied according to requirements in regards to manufacture and production thereof, while still remaining within the scope and principles of my invention, without prejudicing the novelty thereof.

I claim:

1. A pipe cutting tool comprising a cylindrical cutter holder bisected substantially across a diameter to form a male and a female cutter holder half parts, said male half parts being supplied with a male dovetail and said female half part being supplied with a female dovetail, said male dovetail being slideable into said female dovetail to form said cylindrical cutter holder, at least one slot formed radially in one end surface of said cutter holder, a cutter slideably located within said radial slot, said cutter having a cutting edge directed inwards towards the axis of said cutter holder, spring means located within said cutter holder for biasing said cutter towards said axis, said cylindrical cutter holder having a bore located centrally and axially therethrough for receiving a pipe to be cut, a cutter retaining cover plate detachably attached on said end surface of each said half part of said cutter holder, said male and female dovetail extending from said end surface, a portion only of the length of said cylindrical cutter holder, opposite said end surface of each said cutter holder half part, being supplied with a half portion of an annular groove, both said half portions of annular groove providing a complete annular groove upon said dovetails being fully slideably engaged, a plurality of ratchet teeth located in the base of said annular groove, a ratchet ring surrounding said groove, said ratchet ring having an annular internally projecting collar fitting into said annular groove, a ratchet pawl located in said ratchet ring, said ratchet pawl being biased by spring means radially inwards towards said ratchet teeth, said ratchet ring being bisected across a diameter, to provide a main ratchet half portion and a secondary ratchet half portion, said secondary hatchet half portion having one end hingeably attached to said main ratchet half portion, lock means for holding the free end of said secondary ratchet half portion, firmly against said main ratchet half portion and handle means attached to said main ratchet half portion for reciprocally turning said ratchet ring.

2. A pipe cutting tool as claimed in claim 1 in which said cover plate of said female cutter holder half part extends across said female dovetail to provide stop means for the male dovetail of said male cutter holder half part.

References Cited by the Examiner
UNITED STATES PATENTS

| | | | |
|---|---|---|---|
| 888,724 | 5/1908 | Moore | 30—98 |
| 996,602 | 7/1911 | Anderson | 30—99 |
| 1,092,304 | 4/1914 | Strickler | 30—99 |
| 2,877,549 | 3/1959 | Landreth | 30—99 |

WILLIAM FELDMAN, *Primary Examiner.*

MYRON C. KRUSE, *Examiner.*